(12) United States Patent
Yamamoto

(10) Patent No.: US 7,018,036 B2
(45) Date of Patent: Mar. 28, 2006

(54) LENGTH ADJUSTABLE TEMPLE FOR EYEGLASSES

(75) Inventor: Toshiyuki Yamamoto, Fukui (JP)

(73) Assignee: KT Optica Inc., Fukui-Ken (JP)

( * ) Notice: Subject to any disclaimer, the term of this patent is extended or adjusted under 35 U.S.C. 154(b) by 25 days.

(21) Appl. No.: 10/889,009

(22) Filed: Jul. 13, 2004

(65) Prior Publication Data

US 2005/0012893 A1    Jan. 20, 2005

(30) Foreign Application Priority Data

Jul. 14, 2003  (JP) ............................ 2003-196440
Nov. 7, 2003  (JP) ............................ 2003-378492

(51) Int. Cl.
G02C 5/20        (2006.01)

(52) U.S. Cl. ........................ 351/118; 351/119; 351/122; 351/123

(58) Field of Classification Search ................ 351/118, 351/119, 111, 123, 122, 121, 41
See application file for complete search history.

(56) References Cited

U.S. PATENT DOCUMENTS 6,176,576 B1 * 1/2001 Green et al. ................ 351/123

FOREIGN PATENT DOCUMENTS

| JP | 4-50818 | 4/1992 |
| JP | 7-270725 | 10/1995 |
| JP | 9-281446 | 10/1997 |

* cited by examiner

Primary Examiner—Hung Xuan Dang
(74) Attorney, Agent, or Firm—Wenderoth, Lind & Ponack, L.L.P.

(57) ABSTRACT

In order to provide a length-adjustable temple for eyeglasses which is easy-to-wear by engaging a concavity of an ear without giving pain to a wearer irrespective of the shape of the ear, a distal member is coupled to a proximal member via a length adjustable joint portion, the distal member is formed by a bent or curved arm portion of elastic material which is superior in flexible deformation, and the arm portion is formed with a pad to be fitted on the outer periphery or in the concavity inside the outer periphery of the ear at the distal portion thereof.

9 Claims, 8 Drawing Sheets

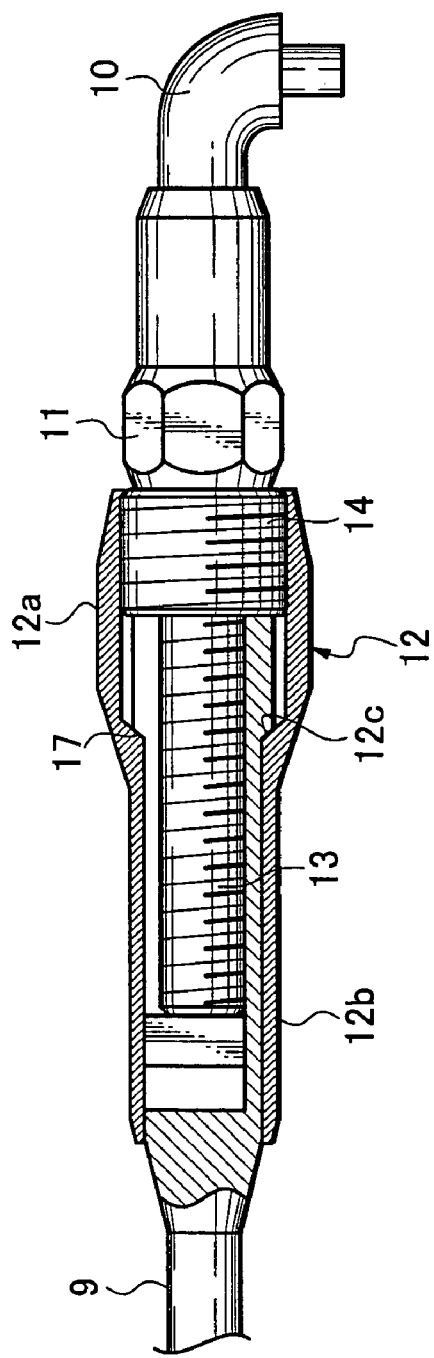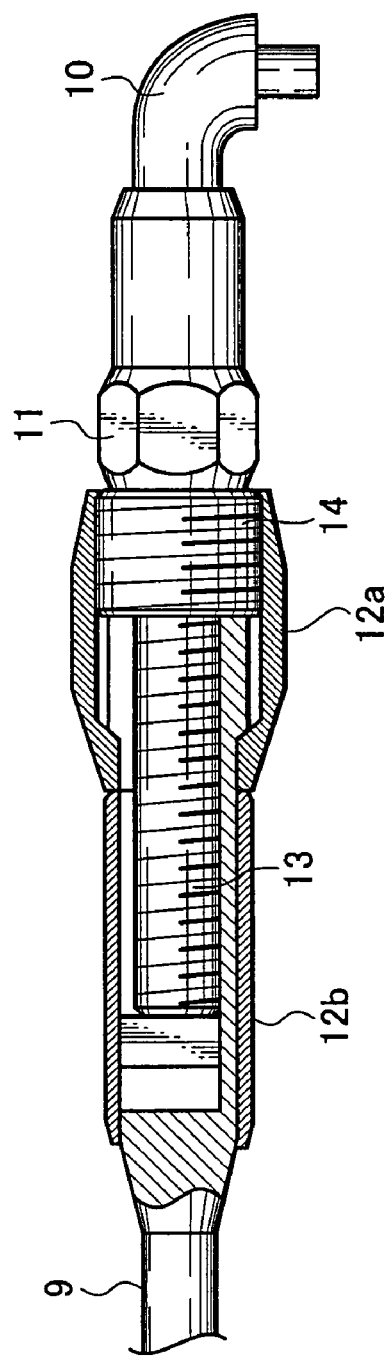
Fig. 6
Fig. 7

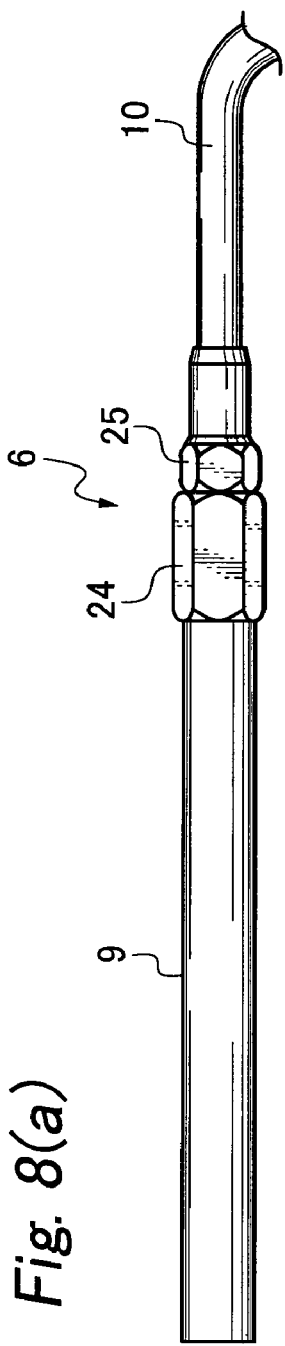
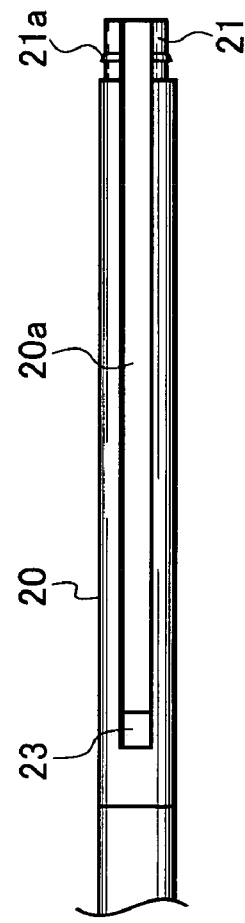
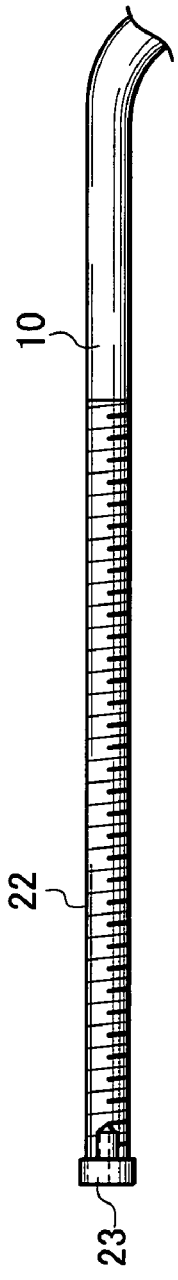
Fig. 8(a)
Fig. 8(b)
Fig. 8(c)

LENGTH ADJUSTABLE TEMPLE FOR EYEGLASSES

BACKGROUND OF THE INVENTION

1. Field of the Invention

The present invention relates to a length-adjustable temple for eyeglasses capable of fitting a concavity inside the outer periphery of an ear and having a length adjusting function.

2. Related Art

General eyeglasses are adapted to be worn by engaging substantially L-shaped earpieces of eyeglass temples provided at the distal portion thereof with ears. However, in the case of presbyopia spectacles, which are used temporarily for reading newspapers or magazines, the wearer tends to choose eyeglasses having a compact front frame. This is not only because of convenience of portability, but also because it is not necessary to use large sized lenses for the temporary use. However, even when the size of the front frame is small, it is still impossible to downsize the eyeglasses entirely unless the length of the temples, which extend from the front frame to engage the ears, is reduced.

An "Eyeglass Temple" is known with JP-U4-50818 in which the length of the temples is shortened by providing engaging portions to be engaged with the concavities inside the outer peripheries of the ears at the distal portions of the temples to reduce the entire size of the eyeglasses in a state in which the temples are folded.

However, since the shape of human beings' ears varies from person to person, the engaging portions can hardly be engaged with the concavities inside the outer peripheries of the ears only by forming the engaging portions at the distal portions of the temples in many cases. If they are forced to engage, the wearer might feel pain, or in some cases, the eyeglasses might fall off. In the above-described document, there is also disclosed an embodiment in which the entire temple is formed of a spring member. However, since the temple formed of a spring member tends to cause overall flexible deformation, the fitting pressure applied on the concavity is too small to give comfortable feeling of fitness to the wearer when he/she wears the eyeglasses and, in addition, it is apt to fall off easily.

In order to fit eyeglasses to the wearer's face, the entire length of the temple is normally regulated by adjusting the bending degree of the earpieces. In the related art, a pair of eyeglasses provided with a temple length adjusting mechanism for facilitating adjustment of the length of the temples is known (JP-A-7-270725, JP-A-9-281446).

JP-A-7-270725 discloses an elastic structure of a temple, in which elasticity is provided to the temples by fitting coil springs over the outer peripheries of the distal portions of the temples, fixing an end of each coil spring to the distal end of each temple, forming a hollow vacancy inside the earpiece, fixing the other end of the coil spring to an inner periphery of the hollow vacancy of the earpiece, and utilizing the hollow vacancy in the earpiece as a joint member.

JP-A-9-281446 discloses an eyeglass temple including an elastic temple, a rotatable temple, and a base temple, in which the rotatable temple formed into a square tube and the elastic temple formed into a square shaft are overlapped so as to allow the elastic temple to slide freely within the rotatable temple, and an elastic spring is interposed at the overlapped area to provide free elasticity to the elastic temple.

However, with such a length adjusting mechanism using the spring, since adjustment of the length is dependent entirely on elasticity of the spring, the adjusting length is not static, and hence it is subjected to instability. In other words, when adjustment is made to increase the length of temple to a large extent, the spring is pulled with a strong force and hence a stress exerted on the ear increases correspondingly, which may cause pain on the wearer's ears. Under such circumstances, it is difficult to make the temples to fit adequately the wearer's ears, and the adjustable width is limited. Furthermore, the thickness of the temple increases inevitably with the provision of the spring, which may impair the appearance as an eyeglass frame. In other words, it is not suitable to satisfy the recent demand for slim eyeglass frames.

As shown in FIG. 14, a length adjusting mechanism employing a screw mechanism is also known. The length of the temple can be elastically adjusted by rotating a distal temple member (b) with respect to a proximal temple member (a) connected to the front member. The length can be adjusted on the basis of pitch distance of the screw, and is locked at the predetermined length by tightening a lock nut (c). However, the temple member (b) cannot be completely fixed simply by tightening the lock nut (c) and, the direction of the earpiece fitted to the distal portion may change with a small amount of rotation of the temple member (b), whereby it cannot be engaged with the ear any longer.

SUMMARY OF THE INVENTION

An object of the invention is to solve the problems in the related art and to provide an easy-to-wear length-adjustable temple for eyeglasses, in which the temple is reduced in length and is provided at the distal portion thereof with an engaging portion which engages the concavity of the ear so as to achieve engagement without pain irrespective of the shape of the ear.

Accordingly, an eyeglass temple according to the invention includes proximal members connected to both ends of a front frame by means of hinges so as to be freely foldable, and distal members connected to the proximal members via length-adjustable joint portions, the distal member being formed with an arm portion formed of elastic material into a bent or curved shape and hence being superior in flexible deformation, and the arm portion being provided at the distal end thereof with a pad to be engaged with an outer periphery or a concavity inside the outer periphery of an ear. Therefore, by providing the arm portion in the bent or curved shape with characteristic of superior flexible deformation, the pad can fit in the concavity of the ear, and a proper pressure is applied thereto.

By covering at least the area of the arm portion of the distal member by a resin member, entanglement of hairs may be prevented when the wearer is wearing the eyeglasses. Also, when the pad is adapted to be variable in facing direction, the pad can be adapted to the inner shape of the ear and hence can engage with the concavity of the ear properly.

The joint portion may include a threaded portion formed at the proximal side of the distal member or the distal side of the proximal member, a cylindrical fitting portion into which the threaded portion formed at the distal side of the proximal member or the proximal side of the distal member can fit freely, and an adjusting nut to be screwed on the threaded portion to adjust a fitting length of the threaded portion with respect to the fitting portion, the adjusting nut being integrally formed with a locking screw portion having a thread around the outer periphery thereof on the distal end thereof, the fitting portion being provided on the outer periphery thereof with a lock nut for tightening the locking screw portion so that the proximal member can be fixedly connected to the distal member. In this structure, the length of the temple can be adjusted by changing the pitch distance of the screw by rotating the adjusting nut and changing the position thereof.

Since the fitting portion is provided with a guide groove in the axial direction and the distal member or the proximal member is provided with a guide strip assembled at the distal end of the threaded portion thereof, and a projection of the guide strip is fitted in the guide groove, the distal member is prevented from rotating and hence the orientation of the pad is kept unchanged, so that the pad can maintain the appropriate fitting contact with the ear.

A step is formed on the fitting portion at the distal portion thereof to increase the outer diameter, so that the end portion of the inner periphery of the lock nut comes into contact with the step to fixedly tighten the locking screw portion of the adjusting nut.

When a cylindrical cover portion for covering around the fitting portion is provided, and the lock nut is formed separately from the cylindrical cover portion adjacently on the distal side of the cylindrical cover portion, a slim member is obtained. The cylindrical cover portion and the lock nut may be formed integrally.

Preferably, the joint portion includes the fitting portion provided at the distal side of the proximal member, a resin pipe nut connected to the distal member at one end thereof and formed with a thread on the inner peripheral surface thereof, the resin pipe nut being capable of sliding in the fitting portion, and a screw rod to be screwed into the pipe nut, the pipe nut including a locking strip having a groove of V-shape in cross-section at the bottom thereof, the screw rod being formed into a conical shape at the extremity thereof so as to be fitted into the groove of the locking strip while expanding the outer diameters of the locking strip and of the pipe nut to allow the pipe nut to be fixed to the fitting portion. Herein, the resin pipe nut has elasticity to an extent that the outer diameter expands corresponding to the expansion of the outer diameter of the locking strip.

BRIEF DESCRIPTION OF THE DRAWING

FIG. 6 is a plan view, partly in cross-section, of the joint portion;

FIG. 7 is a plan view, partly in cross-section of the joint portion, showing another embodiment;

FIG. 8(a) is a plan view of another embodiment of the joint portion, FIG. 8(b) is a plan view of the fitting portion of the proximal member, and FIG. 8(c) is a plan view showing the threaded portion of the distal member;

DETAILED DESCRIPTION OF PREFERRED EMBODIMENTS

Figure 1:
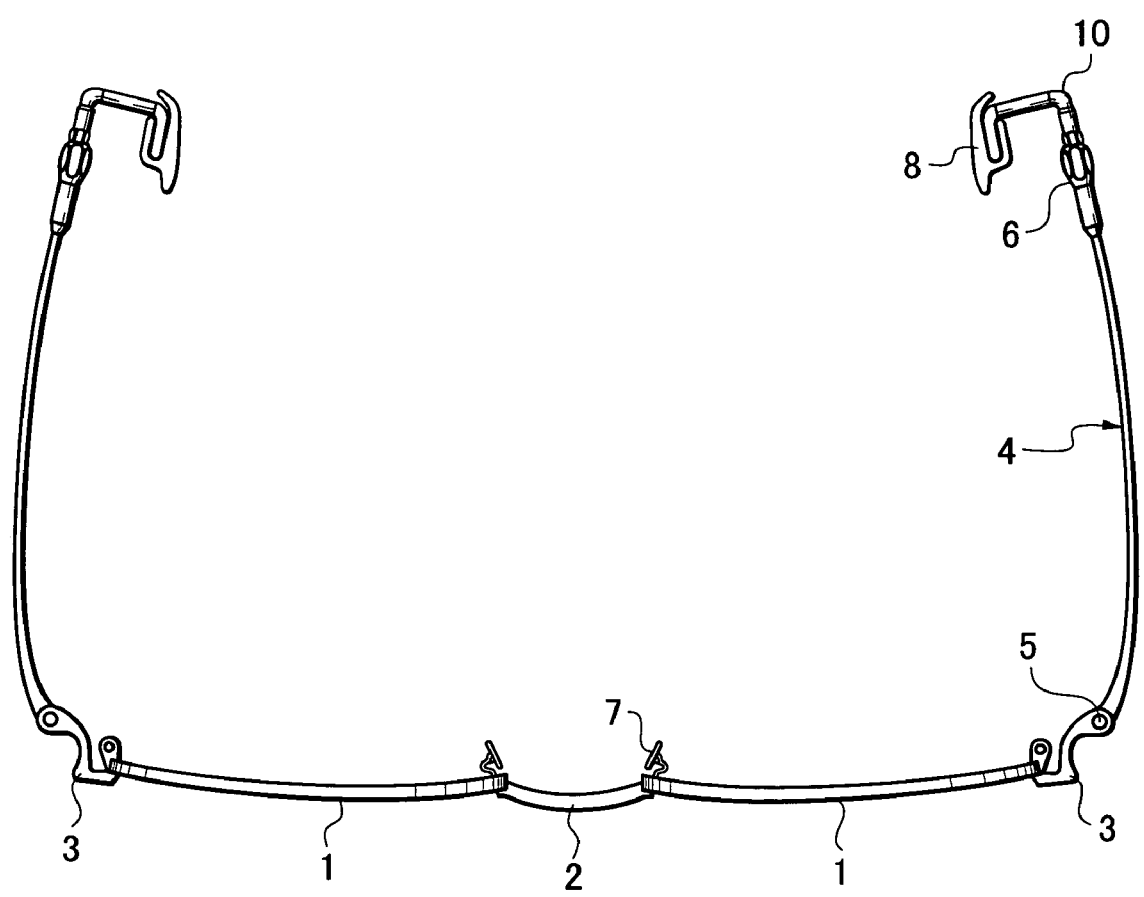
FIG. 1 is a plan view of an eyeglass frame having a length adjustable temple for eyeglasses according to the invention.

FIG. 1 shows an eyeglass frame having expandable temples according to the present invention, in which a pair of rims 1, 1 to accommodate a pair of lenses fitted therein are brazed to both ends of a bridge 2, endpieces 3, 3 are brazed and fixed to the rims 1, 1 at the outsides thereof, and temples 4, 4 are attached to the extremities of the endpieces 3, 3 via hinges 5, 5 so as to be foldable. Also, as for the rim 1, nose pads 7, 7 are attached to the inner sides of the rims 1, 1.

Figure 2A:
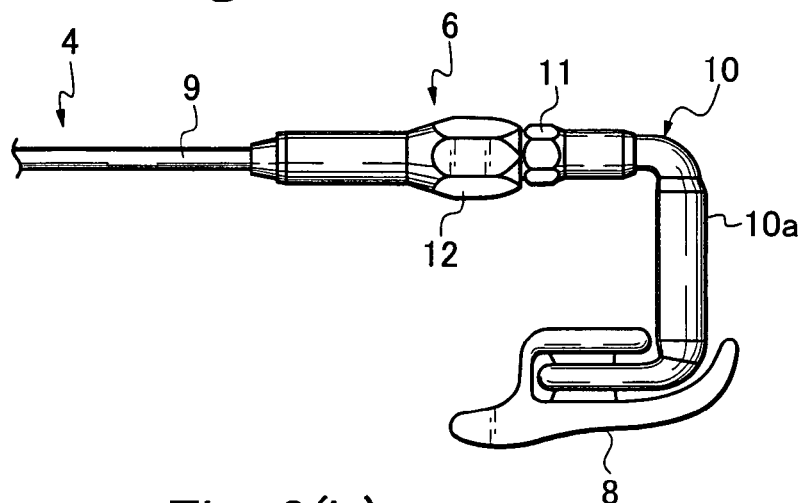
FIG. 2(a) is a plan view of a length adjustable temple for eyeglasses according to the invention.
Figure 2B:
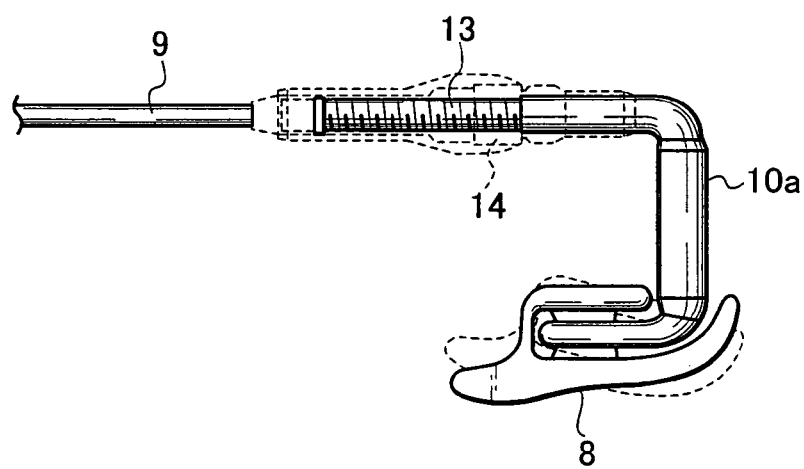
FIG. 2(b) is a plan view of the inside structure of a joint portion.

As shown in FIGS. 2(a) and 2(b), the temple 4 includes a proximal member 9 and a distal member 10 which is connected to the proximal member via a length adjustable joint portion 6. The distal member 10 is bent and includes an arm portion 10a formed of resilient material and superior in flexible deformation. At the distal end of the arm portion, there is provided a pad 8 which is to be engaged with an outer periphery B or a concavity C (see FIG. 13) inside the outer periphery of an ear A.

Figure 3A:
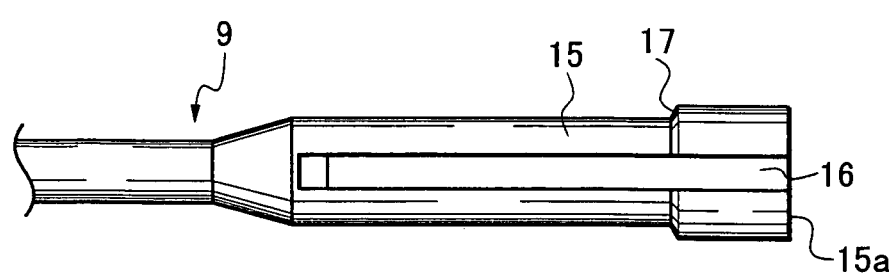
FIG. 3(a) is a plan view of a fitting portion of the distal member of the joint portion.
Figure 3B:
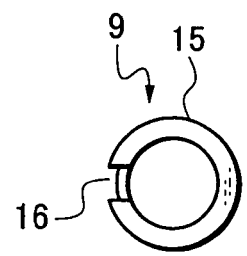
FIG. 3(b) is a right side view of the same.
Figure 4A:
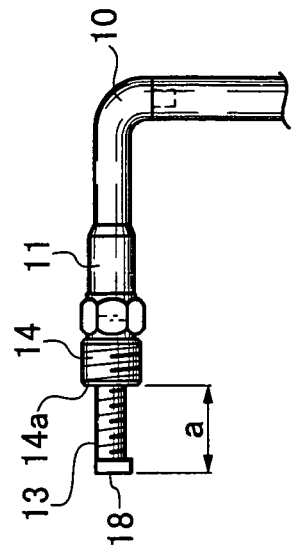
FIGS. 4(a) and 4(b) are plan views showing a state in which an adjusting nut is screwed on a threaded portion of the distal member.

As shown in FIGS. 3(a) and 3(b), the proximal member 9 is formed with a fitting portion 15 formed into a cylindrical shape having an opening at the distal portion thereof. The fitting portion 15 includes an axially extending guide groove 16 having an opening at the extremity thereof, and is increased in outer diameter to form a step 17 on the outer periphery on the distal portion. On the other hand, as shown in FIG. 4(a), the distal member 10 is formed with a threaded portion 13 at the proximal side thereof so as to fit into the fitting portion 15, and is provided at the distal end thereof with a guide strip 18 partly extruding outwardly of the threaded portion 13 to be slidably fitted in the guide groove 16. The guide strip 18 serves to prevent the threaded portion 13 from rotating within the fitting portion 15. Therefore, the direction of the distal member 10 is kept stable and hence the position of the pad 8 attached at the distal end does not change.

Figure 4B:
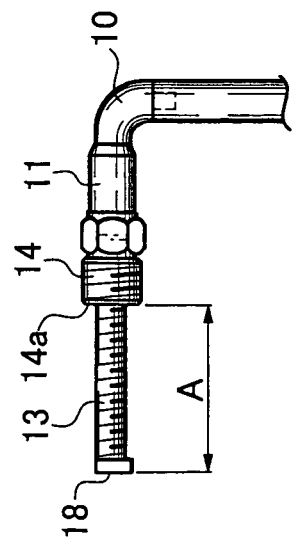

An adjusting nut 11 and a lock nut 12 are provided at the joint portion 6 (see FIG. 2(a)). The adjusting nut 11 is screwed onto the threaded portion 13 and is formed integrally with a locking screw portion 14 on the outer periphery of the distal portion thereof. When the position of the adjusting nut 11 is moved rightward, a length "A" from the proximal end of the distal member 10 to the adjusting nut 11 increases (see FIG. 4(a)), and when the position of the adjusting nut 11 is moved leftward, a length a from the proximal end of the distal member 10 to the adjusting nut 11 decreases (see FIG. 4(b)). In other word, increase in length of the temple 4 is achieved by decreasing the length of the threaded portion 13 to be fitted as shown in FIG. 4(b), and in contrast, decrease in length of temple 4 is achieved by increasing the length of the threaded portion 13 to be fitted.

Figure 5A:
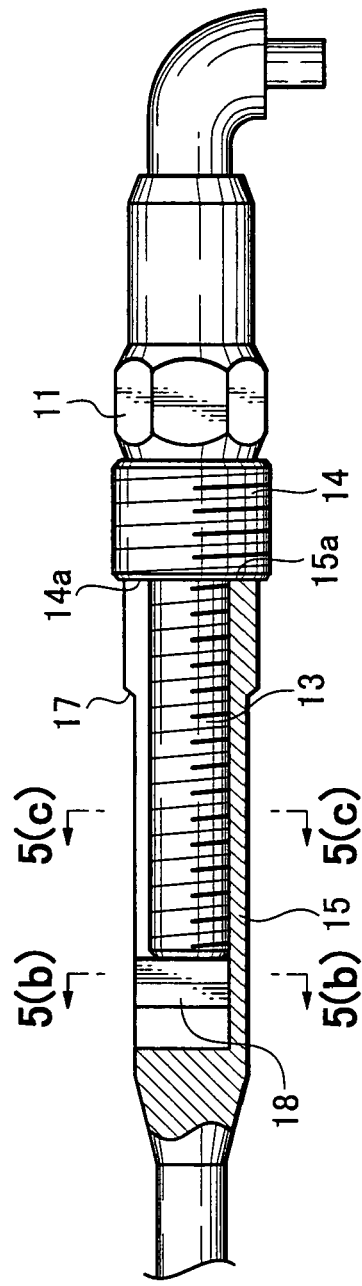
FIG. 5(a) is a plan view, partly in cross-section, showing a state in which the threaded portion of the distal member is fitted into the fitting portion of the proximal member.
Figure 5C:
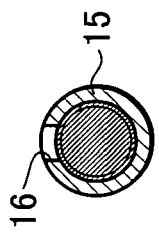
FIGS. 5(b) and 5(c) are cross-sectional views taken along lines 5(b)–5(b) and 5(c)–5(c), respectively, of FIG. 5(a)
Figure 5B:
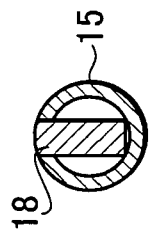

FIG. 5(a) shows a state in which the threaded portion 13 of the distal member 10 is fitted into the fitting portion 15. The threaded portion 13 can be advanced until an end surface 14a of the locking screw portion 14 of the adjusting nut 11 screwed into the threaded portion 13 abuts against a distal end 15a of the fitting portion 15 and, as described above, the length of the threaded portion 13 to be fitted may vary depending on the position of the adjusting nut 11. Also, as shown in FIG. 5(b), the threaded portion 13 is prevented from rotating within the fitting portion 15 by the guide strip 18 being slidably disposed in the guide groove 16 of the fitting portion 15, so that the position of the pad 8 attached at the distal end of the distal member 10 is kept unchanged.

As shown in FIG. 6, the lock nut 12 is rotatably and slidably mounted on the outer periphery of the fitting portion 15. The inner peripheral surface of a distal portion 12a of the lock nut 12 is formed into a shape corresponding to the distal portion of the fitting portion 15 having a larger diameter with the presence of the step 17, and is formed with a thread which can be screwed into the locking screw portion 14 of the threaded portion 13. The lock nut 12 includes an integrally formed cylindrical cover portion 12b of a smaller diameter for covering the fitting portion 15 on the proximal side thereof. As the locknut 12 is fastened to the locking screw portion 14 of the threaded portion 13, a step 12c of the lock nut 12 corresponding to the step 17 having a tapered surface on the fitting portion 15 is fastened, and the proximal member 10 and the distal member 10 are fixedly connected.

As shown in FIG. 7, the cylindrical cover portion 12b may be provided as a different member from a lock nut body 12a. This arrangement may prevent the boundary area between the thin cylindrical cover portion 12b and the lock nut 12a from being twisted and hence a film coated on the surface from scaling off when tightening the lock nut 12a. In this case, the cylindrical cover portion 12b may be brazed and fixed at the predetermined position in advance.

FIGS. 8(a), 8(b) and 8(c) illustrate another embodiment of the joint portion 6. The basic structure is the same as the one shown in FIG. 6, and includes a fitting portion 20 provided at the distal end of the proximal member 9, a threaded portion 22 formed at the proximal side of the distal member 10 so as to be fitted into the fitting portion 20, an adjusting nut 25 to be screwed onto the threaded portion 22, and a locknut 24 mounted on the outer periphery of the fitting portion 20. The fitting portion 20 is provided with a guide groove 20a having an opening at the distal end thereof and extending in an axial direction, and a projection of a guide strip 23 attached to the extremity of the threaded portion 22 is slidably fitted in the guide groove 20a.

However, the locknut 24 is rotatably mounted to an engaging portion 21 provided at the distal end of the fitting portion 20 by being retained by a retaining ring 21a formed on the outer periphery thereof. The locknut 24 is formed on the inner peripheral surface thereof with a thread to be engaged with a locking screw portion formed integrally at the distal end of the adjusting nut 25 and a recessed groove, not shown, to accommodate the retaining ring 21a fitted therein. In other words, the locknut 24 is prevented from coming off by rotatable engagement between the retaining ring 21a on the engaging portion 21 at the distal end of the fitting portion 20 and the recessed groove on the lock nut 24. When the adjusting nut 25 is rotated in this state, the threaded portion 22 being engaged with the adjusting nut 25 is moved so as to allow the distal member 10 to slide with respect to the proximal member 9, whereby the length of the temple may be adjusted. Therefore, according to the structure of the joint portion 6 of the present embodiment, the wearer can adjust the length of the temple and then tighten the locknut 12 conveniently while wearing the eyeglasses.

Figure 9A:
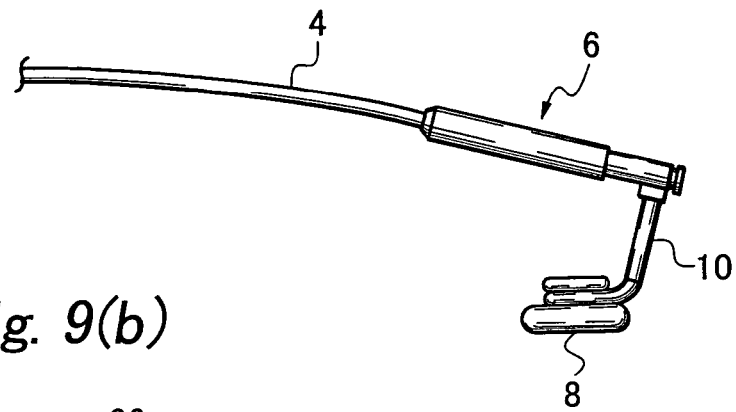
FIG. 9(a) is a plan view of the eyeglass temple according to another embodiment.
Figure 9B:
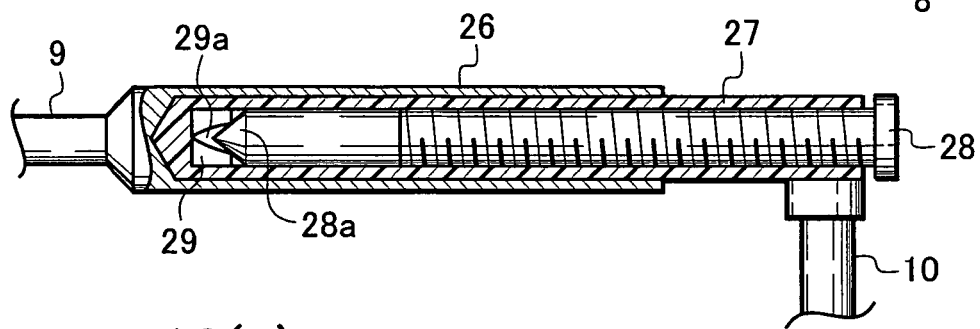
FIG. 9(b) is a cross-sectional view of the joint portion.

FIGS. 9(a) and 9(b) illustrate another embodiment of the joint portion 6 including a fitting portion 26 provided at the distal side of the proximal member 9, a resin pipe nut 27 connected to an end to the distal member 10 and formed with a thread on the inner peripheral surface thereof, the resin pipe nut 27 being slidable in the fitting portion 26, and a screw rod 28 to be screwed into the pipe nut. The pipe nut 27 is formed with a locking strip 29 having a groove 29a of V-shape in cross-section at the bottom thereof, the screw rod 28a being formed into a conical shape at the extremity thereof so as to be fitted into the groove 29a of the locking strip while expanding the outer diameters of the locking strip 29 and of the pipe nut 27 to allow the pipe nut 27 to be fixed to the fitting portion 26.

Figure 10A:
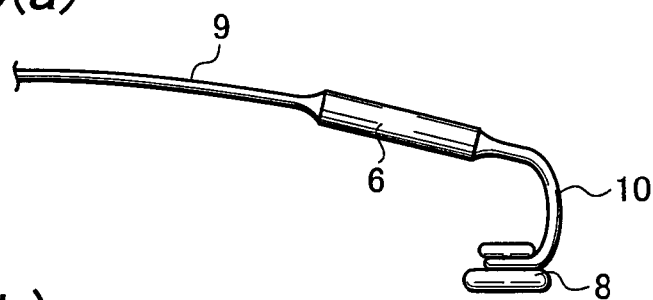
FIG. 10(a) is a plan view of the eyeglass temple according to still another embodiment.
Figure 10B:
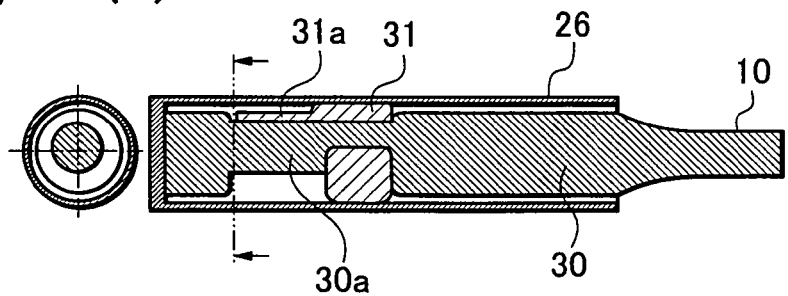
FIG. 10(b) and 10(c) are cross-sectional views of the joint portion.
Figure 10C:
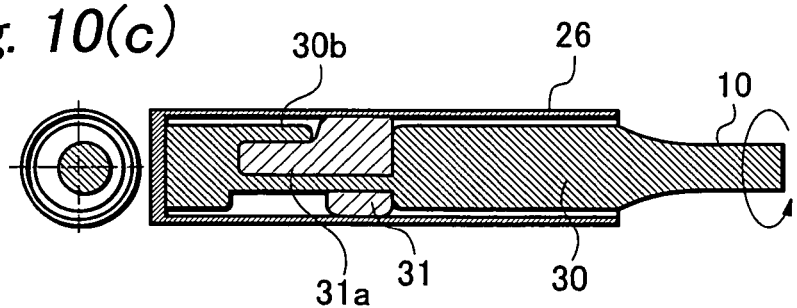

FIGS. 10(a) and 10(b) illustrate still another embodiment of the joint portion 6, including the fitting portion 26 provided at the distal side of the proximal member 9, an adjusting shaft 30 provided at the proximal side of the distal member 10 so as to be capable of being fitted and sliding in the fitting portion 26, and a lock ring 31 mounted on the outer periphery of the adjusting shaft 30. The adjusting shaft 30 is formed with an eccentric shaft portion 30a of smaller diameter so as to generate a clearance with respect to the fitting portion 26, and the lock ring 31 is rotatably mounted on the outer periphery of the eccentric shaft portion 30a. The lock ring 31 has a sufficient thickness to fill up the clearance between the inner peripheral surface of the fitting portion 26 and the eccentric shaft portion 30a, and the thickness thereof varies gradually from the thinner portion toward the thicker portion in accordance with the degree of eccentricity of the eccentric shaft portion 30a. Also, the adjusting shaft 30 is integrally formed with an engaging arm 30b so as to project upward from the eccentric shaft portion 30a situated in the horizontal direction, and the lock ring 31 is integrally formed with an arm 31a at the position on the identical circumference which abuts against the engaging arm 30b.

FIG. 10(a) shows a state in which the adjusting shaft 30 is not locked, and the engaging arm 30b of the adjusting shaft 30 and the arm 31a of the lock ring 31 are spaced apart from each other at a predetermined distance, so that the adjusting shaft 30 is movable within the fitting portion 26 in an axial direction. When the adjusting shaft 30 is rotated counterclockwise after the pad 8 is positioned, and the engaging arm 30b of the adjusting shaft 30 abuts against the arm 31a of the lock ring 31, and rotates together so that the thick portion of the lock ring 31 is pressed toward the narrow part of the clearance between the inner peripheral surface of the fitting portion 26 and the eccentric shaft portion 30a, the adjusting shaft 30 is fixed.

The pad 8 attached at the distal end of the arm portion 10a of the distal member 10 is formed of resin substantially into an egg-like shape with a smooth and curved surface, so as to be fitted in the concavity of the ear and not to be displaced nor detached. The arm portion 10a is formed of an elastic member such as a coil spring so as to engage easily with the concavity of the ear, and is adapted to alleviate or adjust an engaging force.

Figure 11A:
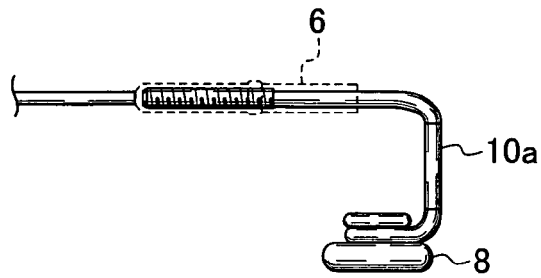
FIGS. 11(a) through 11(g) are plan views showing another embodiment of an arm portion and a pad.

FIGS. 11(a) through 11(g) illustrate the arm portion 10a in various shapes and attached states of the pad 8 to the arm portion 10a. The arm portion 10a shown in FIG. 11(a) is bent substantially into an L-shape and the arm portion 10a can be deflected freely in this form. For an example, even when the position of the pad is displaced to some extent, it may be compensated by flexible deformation of the arm portion 10a, thereby preventing the wearer from feeling pain in his/her ear's concavity. The pad 8 may be formed of relatively soft resin or the surface which may be subjected to contamination may be covered with a covering member.

Figure 11B:
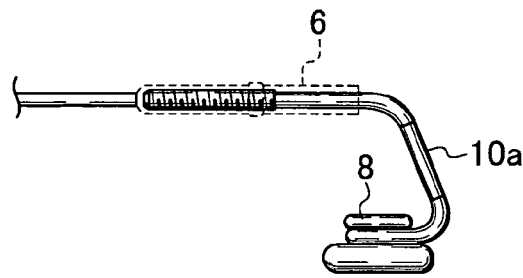
Figure 11C:
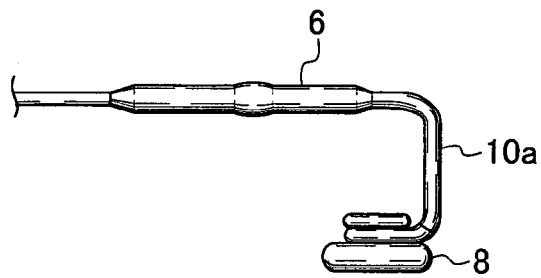

FIG. 11(b) shows substantially the same mode as FIG. 11(a), and illustrates a case in which the bent angle of the arm portion 10a with respect to the temple is different. FIG. 11(c) shows a case in which the outer peripheral surface of the distal portion of the temple FIG. 11(a) is sealed. Since the coil spring is positioned in the vicinity of the ear when the eyeglasses are worn, there may be the case in which the wearer's hairs entangle the coil spring. In order to avoid such an incident, the distal portion is sealed. Though the method of sealing is not limited, it is practically possible to fit the tube thereon and heat the tube.

Figure 11D:
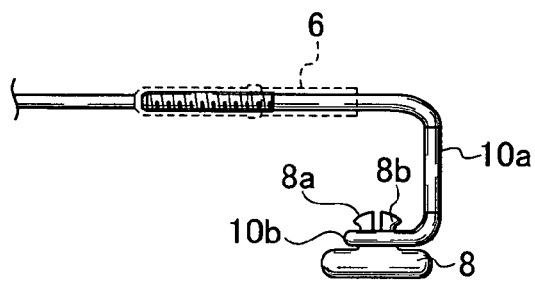
Figure 11E:
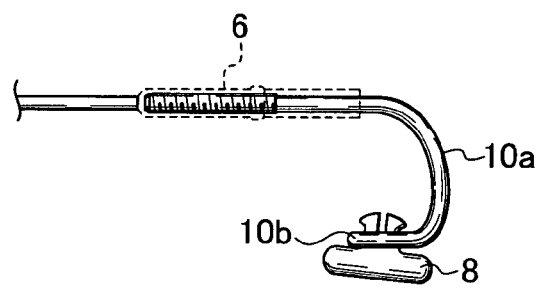
Figure 11F:
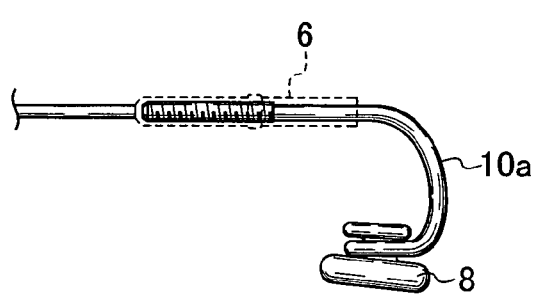
Figure 11F:
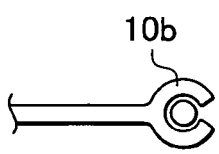

FIG. 11(d) illustrates a case in which means to attaché the pad to the distal end of the arm is different, and other portions are common to the case of FIG. 11(a). In other words, the pad 8 is provided with two legs 8a and 8b which are capable of bending inwardly so as to be attached to a mounting ring 10b at the distal end of the arm by press fitting. FIG. 11(e) shows a structure in which the arm 10a is bent into an arcuate shape and a clearance is left between the legs 8a and 8b of the pad 8 and the mounting ring 10b so that the direction of the pad 8 with respect to the ring 10b may be varied. Also, FIG. 11(f) has the same structure as FIG. 11(e), except for the mounting structure of the pad. The mounting ring 10b is party formed with a notch portion so that the pad 8 can be fitted into the notch portion.

Figure 11G:
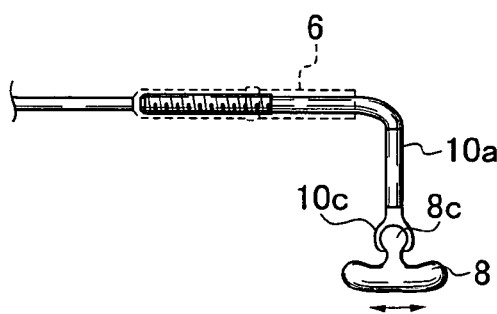

FIG. 11(g) shows that the arm of a coil spring is formed of a bearing portion 10c at the distal end thereof, in which a spherical shaft 8c formed on the pad 8 fits to the bearing portion 10c. Accordingly, the pad 8 can incline at any angle and easily be fitted to the shape of the ear's concavity.

Figure 12A:
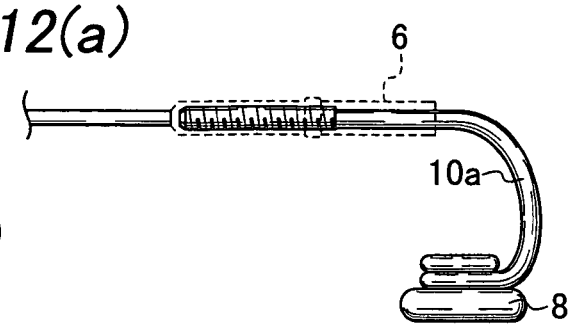
FIGS. 12(a) through 12(c) are a plan view, a rear elevation, and a right side view respectively showing another embodiment of the arm portion and the pad.
Figure 12B:
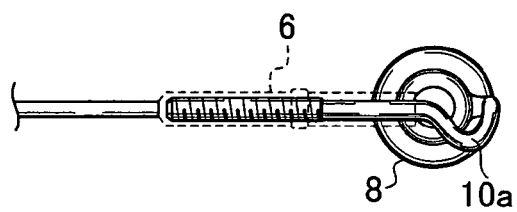
Figure 12C:
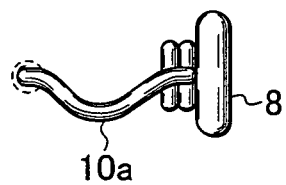

FIGS. 12(a), 12(b) and 12(c) illustrate the form of the distal portion of the temple according to still another embodiment. The arm portion 10a is formed into an arch-shape in the direction of extension and is bent also in the lateral direction so that fine adjustment of the position of the pad is achieved easily.

Figure 13:
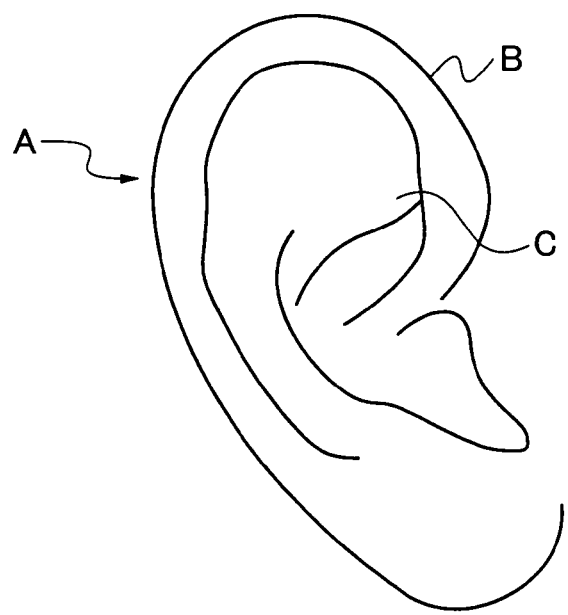
FIG. 13 is a side view of the outer profile of the ear to which the temple of eyeglasses engages.
Figure 14:
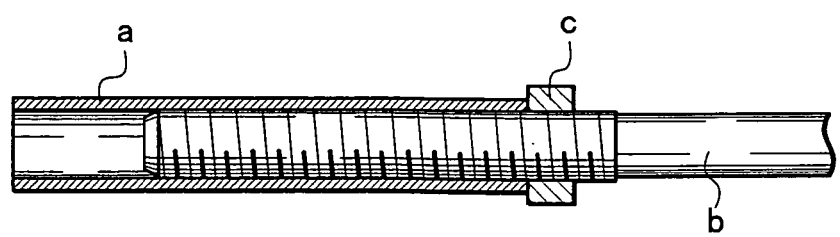
FIG. 14 is a plan view of the joint portion having a length adjustable function of the temple in the related art.

FIG. 13 illustrates a rough sketch of the ear A to which the pad 8 fits and engages. Inside the outer periphery B defining the profile of the ear, there is provided the recessed concavity C. The pad 8 at the distal portion of the temple fits in the concavity C, and neither displacement nor detachment occurs, as a matter of course.

Though FIG. 1 shows the eyeglasses in which the pad 8 is attached at the distal portion of the temple, a similar structure is also applicable to the case in which the earpiece is attached to the distal portion of the temple as in the general eyeglasses.

What is claimed is:

1. An eyeglass temple comprising proximal members connected to both ends of a front frame by means of hinges so as to be freely foldable, and distal members connected to the proximal members via length-adjustable joint portions, each of the distal members being formed with an arm portion formed of elastic material into a bent or curved shape and hence being superior in flexible deformation, and each of the arm portions being provided at the distal end thereof with a pad to be engaged with an outer periphery or a concavity inside the outer periphery of an ear,
wherein, for each of the joint portions, a threaded portion is formed at the proximal side of the distal member or the distal side of the proximal member, a cylindrical fitting portion into which the threaded portion formed at the distal side of the proximal member or the proximal side of the distal member can fit freely is provided, and an adjusting nut is provided to be screwed on the threaded portion to adjust a fitting length of the threaded portion with respect to the fitting portion, the adjusting nut being integrally formed with a locking screw portion having a thread around the outer periphery thereof on the distal end thereof, the fitting portion being provided on the outer periphery thereof with a lock nut for tightening the locking screw portion so that the proximal member can be fixedly connected to the distal member.

2. An eyeglass temple according to claim 1, wherein at least the area of the arm portion of each of the distal members is covered by a resin member.

3. An eyeglass temple according to claim 1, wherein, for each of the pads, the direction of the pad is changeable.

4. An eyeglass temple according to claim 1, wherein, for each of the joint portions, the fitting portion is provided with a guide groove in the axial direction and the distal member or the proximal member is provided with a guide strip, which is projecting outward at one end, assembled at the distal end of the threaded portion thereof, and a projection of the guide strip is fitted in the guide groove, so that the distal member is prevented from rotating.

5. An eyeglass temple according to claim 1, wherein, for each of the joint portions, a step is formed on the fitting portion at the distal portion thereof to increase the outer diameter, so that the end portion of the inner periphery of the lock nut comes into contact with the step to fixedly tighten the locking screw portion of the adjusting nut.

6. An eyeglass temple according to claim 5, wherein, for each of the joint portions, a cylindrical cover portion for covering around the fitting portion is provided, and the lock nut is positioned adjacent to the distal side of the cylindrical cover portion and formed separately from the same.

7. An eyeglass temple according to claim 5, wherein, for each of the joint portions, a cylindrical cover portion for covering around the fitting portion is provided, and the lock nut is formed integrally with the cylindrical cover portion adjacently on the distal side of the cylindrical cover portion.

8. An eyeglass temple comprising proximal members connected to both ends of a front frame by means of hinges so as to be freely foldable, and distal members connected to the proximal members via length-adjustable joint portions, each of the distal members being formed with an arm portion formed of elastic material into a bent or curved shape and hence being superior in flexible deformation, and each of the arm portions being provided at the distal end thereof with a pad to be engaged with an outer periphery or a concavity inside the outer periphery of an ear,
wherein, for each of the joint portions, a fitting portion is provided at the distal side of the proximal member, a resin pipe nut is connected to the distal member at one end thereof and formed with a thread on the inner peripheral surface thereof, the resin pipe nut being capable of sliding in the fitting portion, and a screw rod is provided to be screwed into the pipe nut, the pipe nut including a locking strip having a groove of V-shape in cross-section at the bottom thereof, the screw rod being formed into a conical shape at the extremity thereof so as to be fitted into the groove of the locking strip while expanding the outer diameters of the locking strip and of the pipe nut to allow the pipe nut to be fixed to the fitting portion.

9. An eyeglass temple according to claim 8, wherein, for each of the pads, the direction of the pad is changeable.

* * * * *